(12) United States Patent
Kim

(10) Patent No.: US 11,778,425 B2
(45) Date of Patent: Oct. 3, 2023

(54) METHOD OF OPERATING A GATEWAY, AND A GATEWAY USING THE SAME

(71) Applicant: OPENIT INC., Seoul (KR)

(72) Inventor: Min Young Kim, Seoul (KR)

(73) Assignee: OPENIT INC., Seoul (KR)

( * ) Notice: Subject to any disclaimer, the term of this patent is extended or adjusted under 35 U.S.C. 154(b) by 0 days.

(21) Appl. No.: 18/054,833

(22) Filed: Nov. 11, 2022

(65) Prior Publication Data

US 2023/0156430 A1  May 18, 2023

(30) Foreign Application Priority Data

Nov. 12, 2021 (KR) ........................ 10-2021-0156015

(51) Int. Cl.
| | | |
|---|---|---|
| *H04W 4/029* | (2018.01) | |
| *H04W 4/02* | (2018.01) | |
| *H04W 52/02* | (2009.01) | |
| *H04W 88/16* | (2009.01) | |

(52) U.S. Cl.
CPC ........... *H04W 4/029* (2018.02); *H04W 4/023* (2013.01); *H04W 52/0225* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 10,019,769 B1 * | 7/2018 | Hodge | ................... | H04W 4/30 |
| 11,265,827 B1 * | 3/2022 | Bhattacharyya | ........ | H04W 4/02 |
| 2013/0282438 A1 * | 10/2013 | Hunter | ............... | G06Q 30/0201 705/7.32 |
| 2018/0338237 A1 * | 11/2018 | Maheswaranathan | ...................... | H04W 64/006 |
| 2019/0108699 A1 * | 4/2019 | Ashok | ................... | H04W 4/029 |
| 2019/0339351 A1 * | 11/2019 | Sundia | ............... | G06K 7/10425 |

(Continued)

FOREIGN PATENT DOCUMENTS

| | | |
|---|---|---|
| JP | 2011-030033 A | 2/2011 |
| JP | 2019-507998 A | 3/2019 |
| KR | 10-2012-0004747 A | 1/2012 |

(Continued)

OTHER PUBLICATIONS

Korean Non-Final Office Action for Korean Application No. 10-2021-0156015 dated Jan. 25, 2022, 13 pages (including Translation).

(Continued)

*Primary Examiner* — German Viana Di Prisco
(74) *Attorney, Agent, or Firm* — Sughrue Mion, PLLC

(57) ABSTRACT

Provided is a method of operating a gateway performing communication between a server and a wireless communication terminal, the method comprises receiving, by the gateway, identification information of the wireless communication terminal and sensing data related to the wireless communication terminal and controlling, by the gateway, setting of the wireless communication terminal based on identification information of the gateway and both the received identification information of the wireless communication terminal and the sensing data, wherein the identification information of the gateway comprises information about an area in which the gateway is installed.

13 Claims, 5 Drawing Sheets

(56) References Cited

U.S. PATENT DOCUMENTS

2022/0225947 A1* 7/2022 Logan .................... A61B 5/746

FOREIGN PATENT DOCUMENTS

| KR | 10-2015-0062586 A | 6/2015 |
| KR | 10-2017-0062312 A | 6/2017 |
| KR | 10-2017-0069693 A | 6/2017 |
| KR | 10-2019-0076382 A | 7/2019 |

OTHER PUBLICATIONS

Korean Notice of Allowance for Korean Application No. 10-2021-0156015 dated May 11, 2022, 4 pages (including Translation).

* cited by examiner

METHOD OF OPERATING A GATEWAY, AND A GATEWAY USING THE SAME

BACKGROUND

1. Field

The present disclosure relates to a method of operating a gateway, and a gateway using the same, and more particularly, to a method of operating a gateway capable of controlling setting of a wireless communication terminal based on identification information of the wireless communication terminal, sensing data related to the wireless communication terminal, and identification information of a gateway, and a gateway using the method of operating a gateway.

2. Description of the Related Art

A control system is a system capable of continuously monitoring a status of a control target or situations occurring in the control target by providing various devices for monitoring the situation of the control target in an area requiring security.

In order to monitor the control target, it is necessary to acquire various information about the control target, and the type or precision of the required information may vary depending on the control situation.

SUMMARY

Provided are a method of operating a gateway capable of controlling setting of a wireless communication terminal based on identification information of the wireless communication terminal, sensing data related to the wireless communication terminal, and identification information of a gateway, and a gateway using the method of operating a gateway.

According to an aspect of an embodiment, a method of operating a gateway performing communication between a server and a wireless communication terminal may comprise receiving, by the gateway, identification information of the wireless communication terminal and sensing data related to the wireless communication terminal and controlling, by the gateway, setting of the wireless communication terminal based on identification information of the gateway and both the received identification information of the wireless communication terminal and the sensing data, wherein the identification information of the gateway may comprise information about an area in which the gateway is installed.

According to an aspect of an embodiment, the sensing data may be sensing data directly collected by the wireless communication terminal or sensing data collected from an external device communicatively connected to the gateway.

According to an aspect of an embodiment, the controlling of setting of the wireless communication terminal may comprise controlling a signal transmission level or a signal transmission period of the transmitter included in the wireless communication terminal.

According to an aspect of an embodiment, the controlling of setting of the wireless communication terminal may comprise controlling power setting of at least one sensor included in the wireless communication terminal.

According to an aspect of an embodiment, the information about an area in which the gateway is installed may be classified according to a security level of the area in which the gateway is installed.

According to an aspect of an embodiment, the controlling of setting of the wireless communication terminal may comprise setting a signal transmission period of a transmitter to be relatively short as the security level of the area in which the gateway is installed is relatively high.

According to an aspect of an embodiment, the controlling of setting of the wireless communication terminal may comprise setting a signal transmission level of a transmitter included in the wireless communication terminal to be relatively low as the security level of the area in which the gateway is installed is relatively high.

According to an aspect of an embodiment, the controlling of setting of the wireless communication terminal may comprise determining, by the gateway, a management level of an owner of the wireless communication terminal based on the identification information of the wireless communication terminal, and controlling, by the gateway, setting of the wireless communication terminal according to the determined management level.

According to an aspect of an embodiment, the management level may be severity of a patient in hospital facility or risk of a prisoner in correctional facility.

According to an aspect of an embodiment, the controlling of setting of the wireless communication terminal may comprise determining, by the gateway, whether an abnormal situation occurs in an owner of the wireless communication terminal based on the sensing data, and controlling, by the gateway, setting of the wireless communication terminal according to the determined occurrence of the abnormal situation.

According to an aspect of an embodiment, the controlling of setting of the wireless communication terminal may comprise setting, by the gateway, a relatively short signal transmission period of a transmitter included in the wireless communication terminal, or setting a relatively low signal transmission level of the transmitter when the abnormal situation occurs.

According to an aspect of an embodiment, the controlling of setting of the wireless communication terminal may comprise controlling, by the gateway, different settings of the wireless communication terminal according to a type of the abnormal situation.

According to an aspect of an embodiment, the controlling of setting of the wireless communication terminal may comprise checking, by the gateway, a location of the wireless communication terminal requiring setting control, and starting setting control when the location of the wireless communication terminal is located within a settable area.

According to an aspect of an embodiment, the settable area may be set to be less than a communicable area of the gateway.

According to an aspect of an embodiment, the method may further comprise transmitting, by the gateway, data for controlling setting of the wireless communication terminal to an adjacent gateway based on a movement pattern of the wireless communication terminal when the location of the wireless communication terminal is within the communicable area of the gateway but is outside the settable area.

According to an aspect of an embodiment, a gateway performing communication between a server and a wireless communication terminal may comprise a communication interface receiving identification information of the wireless communication terminal and sensing data related to the wireless communication terminal, and a setting controller configured to control setting of the wireless communication terminal based on identification information of the gateway and both the received identification information of the wireless communication terminal and the sensing data, wherein the identification information of the gateway may comprise information about an area in which the gateway is installed.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
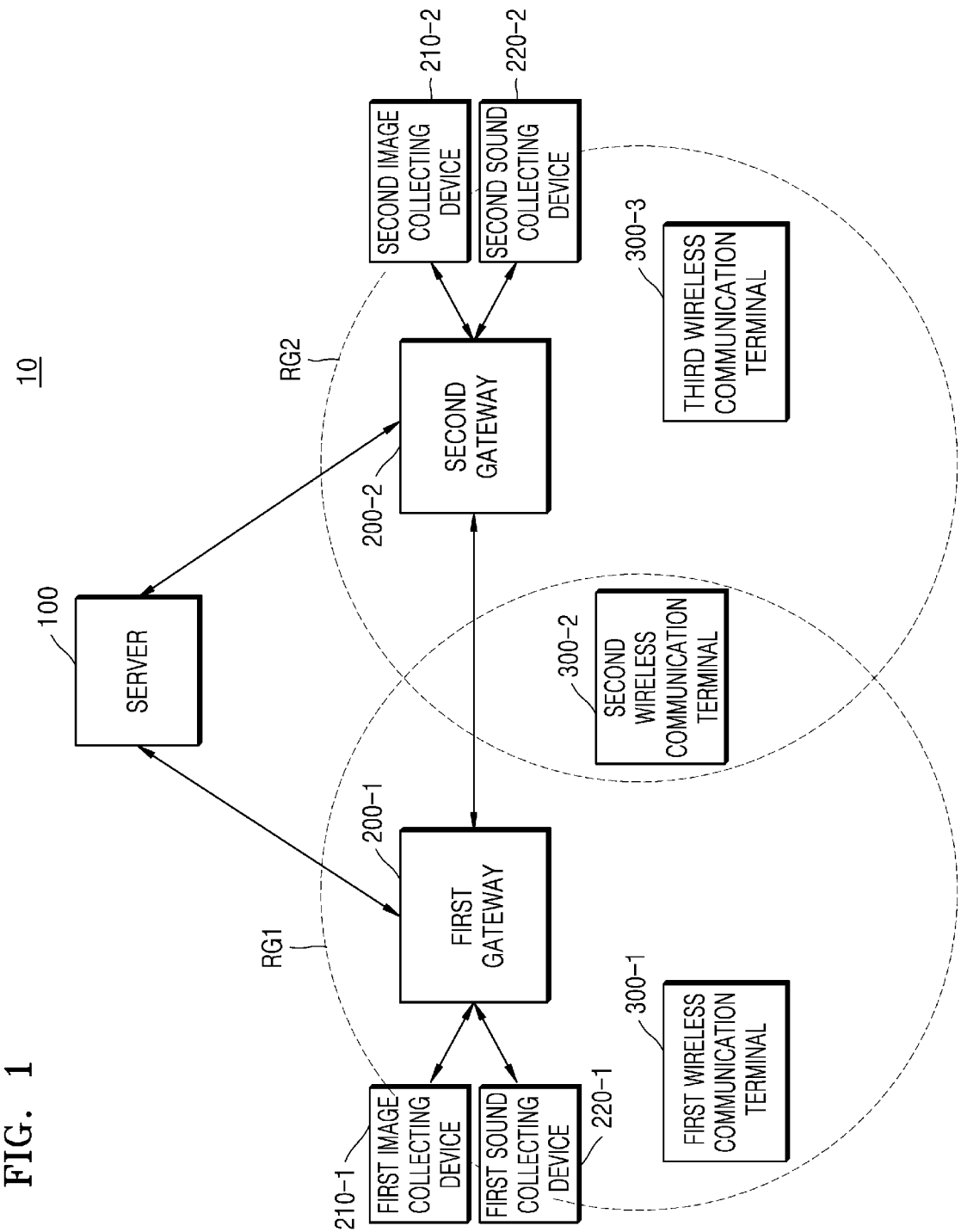
FIG. 1 is a conceptual diagram of a control system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a control system according to an embodiment.

Referring to FIG. 1, a control system 10 according to an embodiment may include a server 100, a plurality of gateways 200-1 and 200-2, a plurality of image collecting devices 210-1 and 210-2, a plurality of sound collecting devices 220-1 and 220-2, and a plurality of wireless communication terminals 300-1, 300-2, and 300-3.

The server 100 may determine control situations occurring in a space controlled by the control system 10, and may provide a variety of information regarding the determined control situations to an administrator.

The plurality of gateways 200-1 and 200-2 may perform communication between the server 100 and the plurality of wireless communication terminals 300-1, 300-2, and 300-3, respectively.

Each of the plurality of gateways 200-1 and 200-2 may communicate with the wireless communication terminal 300-1, 300-2, or 300-3 belonging to respective communicable areas RG1 and RG2 (that is, communication coverage) of the gateways 200-1 and 200-2.

According to an embodiment, when performing communication in a form in which each of the plurality of gateways 200-1 and 200-2 receives a communication signal periodically transmitted by the wireless communication terminal 300-1, 300-2, or 300-3, a range of the communicable areas RG1 and RG2 may be determined by a range within which a communication signal of the wireless communication terminal 300-1, 300-2, or 300-3 may reach or a signal transmission level of the wireless communication terminal 300-1, 300-2, or 300-3.

For example, when communication is performed through a beacon included in the wireless communication terminal 300-1, 300-2, or 300-3, the communicable areas RG1 and RG2 may be determined by a range within which a Bluetooth signal transmitted by the beacon may reach.

According to an embodiment, the first gateway 200-1 may perform wired or wireless communication with the second gateway 200-2.

Each of the plurality of image collecting devices 210-1 and 210-2 may communicate with gateway 200-1 or 200-2 corresponding to each of the plurality of image collecting devices 210-1 and 210-2, and may transmit collected image data to the corresponding gateway 200-1 or 200-2.

According to an embodiment, the first image collecting device 210-1 may collect an image within the range of the communicable area RG1 of the first gateway 200-1, and the second image collecting device 210-2 may collect an image within the range of the communicable area RG2 of the second gateway 200-2. The first image collecting device 210-1 may transmit collected image data to the first gateway 200-1, and the second image collecting device 210-2 may transmit collected image data to the second gateway 200-2.

Each of the plurality of sound collecting devices 220-1 and 220-2 may communicate with the gateway 200-1 or 200-2 corresponding to each of the plurality of sound collecting devices 220-1 and 220-2, and may transmit collected sound data to the corresponding gateway 200-1 or 200-2. For example, the first sound collecting device 220-1 may transmit collected sound data to the first gateway 200-1, and the second sound collecting device 220-2 may transmit collected sound data to the second gateway 200-2.

According to an embodiment, the first sound collecting device 220-1 may collect sounds within the range of the communicable area RG1 of the first gateway 200-1, and the second sound collecting device 220-2 may collect sounds within the range of the communicable area RG2 of the second gateway 200-2.

Image data collected by the image collecting device 210-1 or 210-2 and sound data collected by the sound collecting device 220-1 or 220-2 may be used to determine an abnormal situation.

Each of the wireless communication terminals 300-1, 300-2, and 300-3 may be implemented as various types of devices capable of wireless communication.

According to an embodiment, each of the wireless communication terminals 300-1, 300-2, and 300-3 may be implemented as a portable wearable device in a form worn by a user.

Each of the wireless communication terminals 300-1, 300-2, and 300-3 may collect sensing data from sensors included in each of the wireless communication terminals 300-1, 300-2, and 300-3.

According to an embodiment, each of the wireless communication terminals 300-1, 300-2, and 300-3 may collect location data, motion sensing data, or sensing data regarding whether a user wears the wireless communication terminal.

According to an embodiment, each of the wireless communication terminals 300-1, 300-2, and 300-3 may directly collect location data of each of the wireless communication terminals 300-1, 300-2, and 300-3 using various methods (e.g., Received Signal Strength (RSS), Time of Flight (TOF), angle of arrival, indoor geomagnetic field distribution pattern, etc.).

According to another embodiment, each of the wireless communication terminals 300-1, 300-2, and 300-3 may transmit a communication signal (e.g., a Bluetooth signal) to the gateway 200-1 or 200-2 located within a communication range (e.g., RG1 or RG2). Location data of each of the wireless communication terminals 300-1, 300-2, and 300-3 may be collected through the location of at least one gateway (200-1 or 200-2) that has received the communication signal (e.g., the Bluetooth signal) transmitted from each of the wireless communication terminals 300-1, 300-2, and 300-3. In this case, the location data may refer to the communication signal (e.g., the Bluetooth signal) transmitted from each of the wireless communication terminals 300-1, 300-2, and 300-3.

According to an embodiment, each of the wireless communication terminals 300-1, 300-2, and 300-3 may include a sensor for collecting motion sensing data (e.g., accelerometer, gyro sensor, etc.).

According to another embodiment, each of the wireless communication terminals 300-1, 300-2, and 300-3 may include a sensor capable of sensing a state of contact with an owner of each of the wireless communication terminals 300-1, 300-2, and 300-3.

Each of the wireless communication terminals 300-1, 300-2, and 300-3 may transmit collected sensing data and identification information of each of the wireless communication terminals 300-1, 300-2, and 300-3 to the gateway 200-1 or 200-2. The identification information of each of the wireless communication terminals 300-1, 300-2, and 300-3 may be stored in advance in a memory (not shown) in the wireless communication terminals 300-1, 300-2, and 300-3.

According to an embodiment, identification information of a wireless communication terminal may refer to various pieces of information for identifying the wireless communication terminal, for example, a media access control (MAC) address, international mobile equipment identity (IMEI), and the like.

Figure 2:
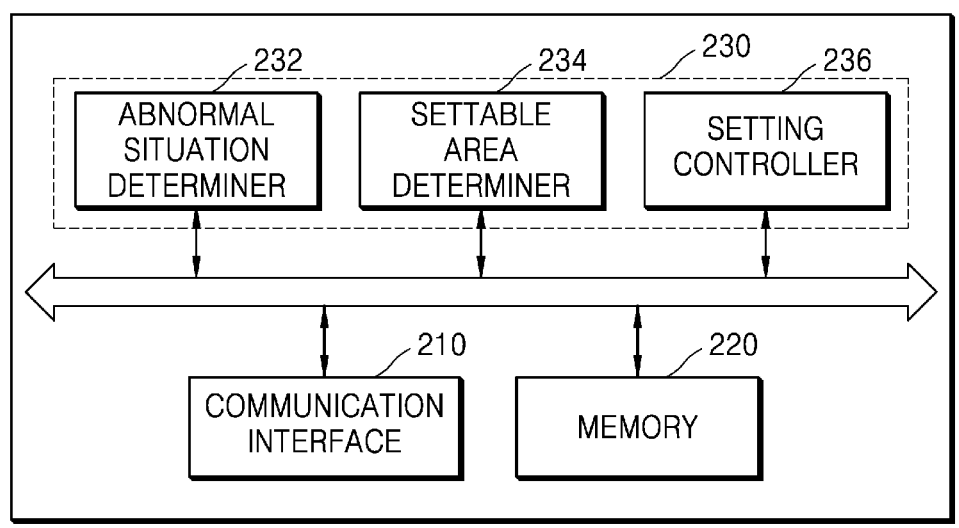
FIG. 2 is a block diagram of a gateway shown in FIG. 1, according to an embodiment.
Figure 3:
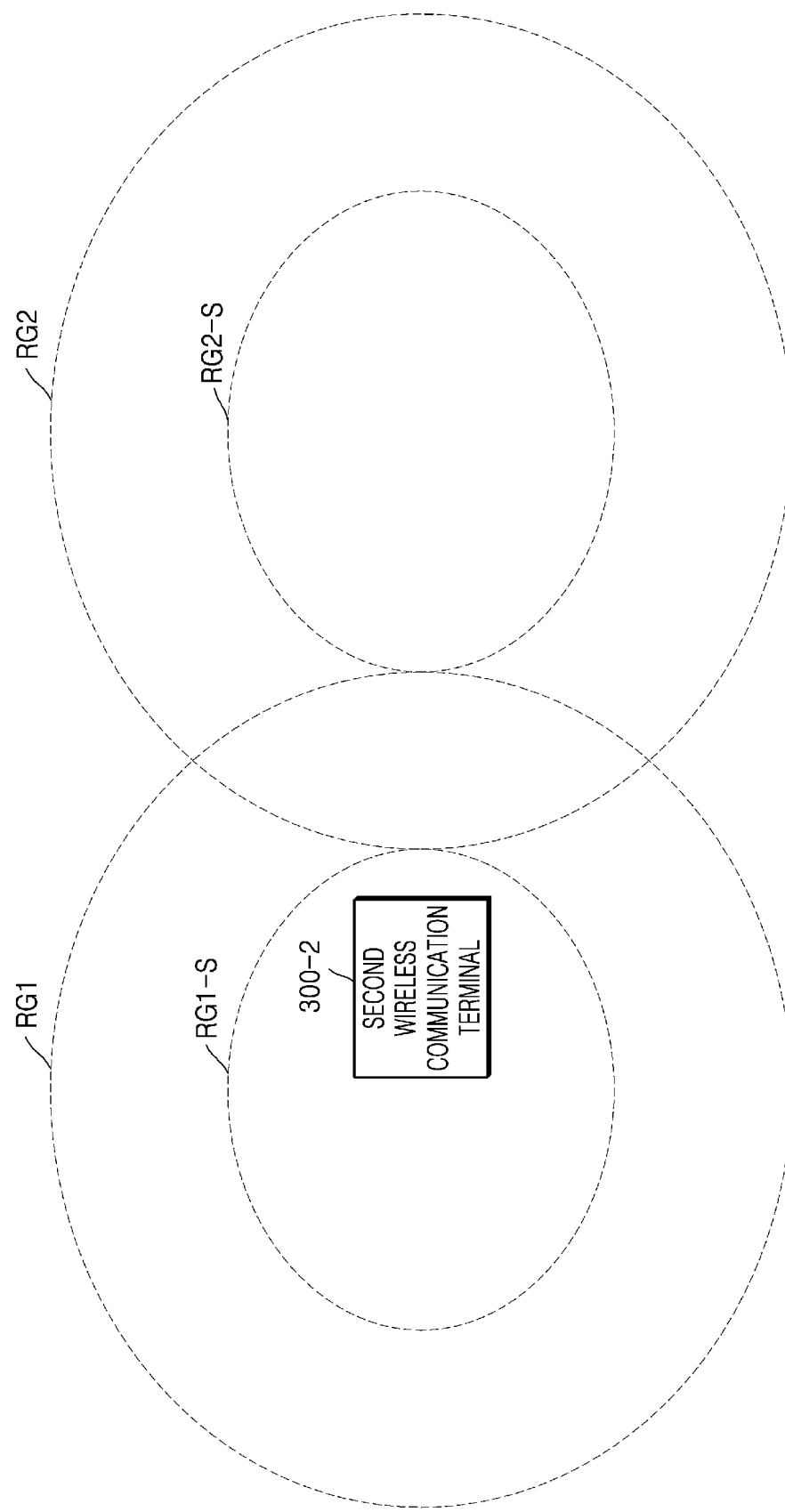
FIGS. 3 and 4 are conceptual diagrams illustrating a method of setting control that varies depending on the location of a wireless communication terminal in the control system of FIG. 1.
Figure 4:
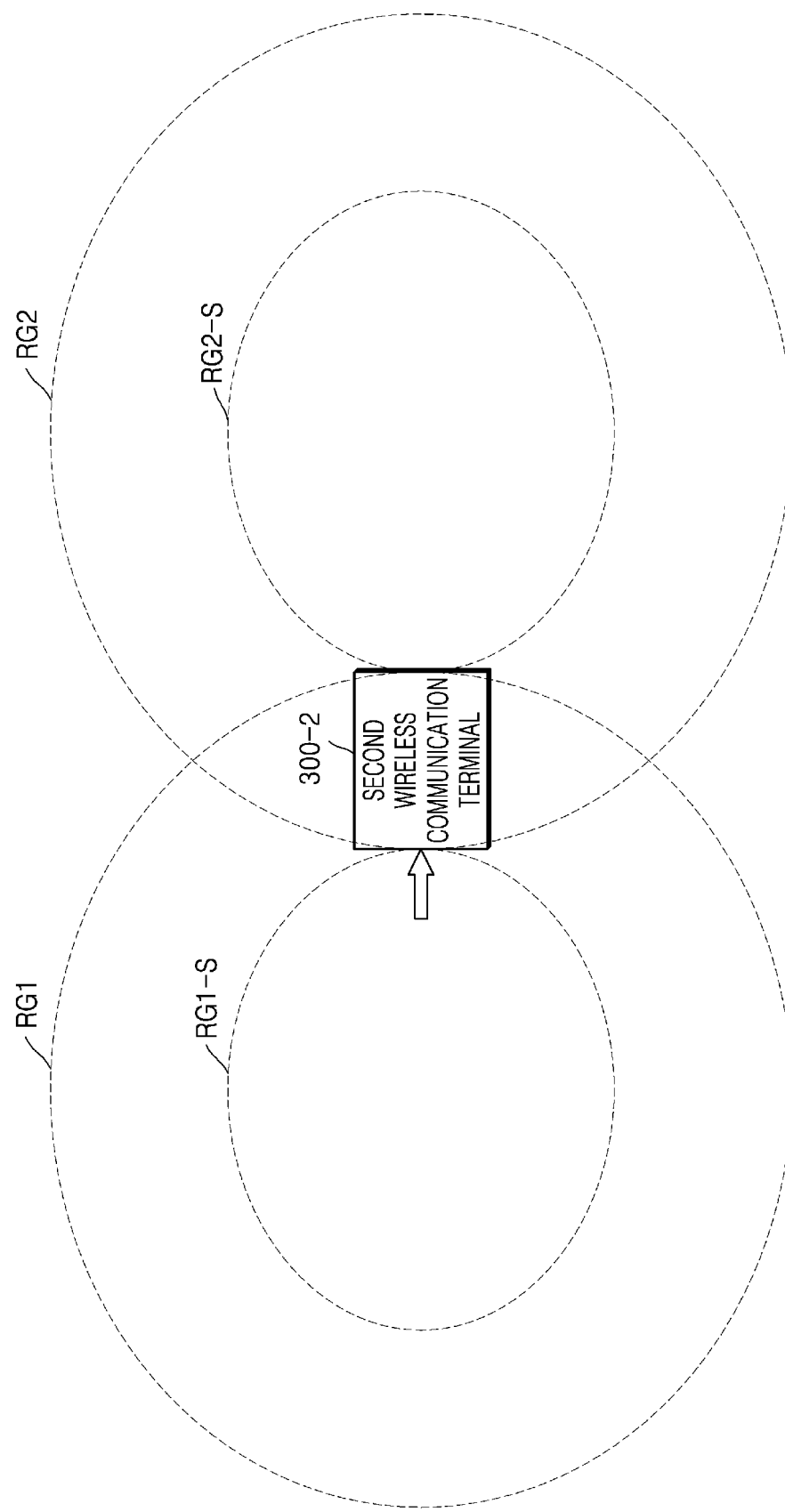

FIG. 2 is a block diagram of the gateway shown in FIG. 1, according to an embodiment. FIGS. 3 and 4 are conceptual diagrams illustrating a method of setting control that varies depending on the location of a wireless communication terminal in the control system of FIG. 1.

FIG. 2 shows only the first gateway 200-1 from among the gateways 200-1 and 200-2 shown in FIG. 1, but the second gateway 200-2 may have a structure substantially the same as that of the first gateway 200-1, and may operate in substantially the same manner as that of the first gateway 200-1.

Referring to FIGS. 1 and 2, the first gateway 200-1 may include a communication interface 210, a memory 220, and a processor 230.

The communication interface 210 may interface communication between the server 100 and the first gateway 200-1, communication between the second gateway 200-2 and the first gateway 200-1, and communication between wireless communication terminals (e.g., 300-1 and 300-2) and the first gateway 200-1, and may process data or signals transmitted and received during the interfacing process.

The memory 220 may temporarily or permanently store data required to process the processor 230, data generated during or after the processing of the processor 230, or the like.

The processor 230 may include an abnormal situation determiner 232, a settable area determiner 234, and a setting controller 236.

Each of the abnormal situation determiner 232, the settable area determiner 234, and the setting controller 236 may mean program code and a logical unit or set of hardware resources capable of executing the program code, and does not necessarily mean physically connected code or a single type of hardware.

The abnormal situation determiner 232, the settable area determiner 234, and the setting controller 236 may be functionally and logically separated from each other, and this does not necessarily mean that the components are divided into separate physical devices or written in separate codes.

The abnormal situation determiner 232 may determine whether an abnormal situation occurs based on sensing data related to the wireless communication terminals 300-1 to 300-3.

According to an embodiment, the sensing data related to the wireless communication terminals 300-1 to 300-3 may be sensing data directly collected by the wireless communication terminals 300-1 to 300-3 or sensing data collected from an external device (e.g., the image collecting device 210-1 or the sound collecting device 220-1) communicatively connected to the first gateway 200-1.

According to an embodiment, the abnormal situation may broadly mean a case where there is a problem in the operation of the wireless communication terminals 300-1 to 300-3, causing an obstacle in additional authentication using the wireless communication terminals 300-1 to 300-3, or the wireless communication terminals 300-1 to 300-3 may be possessed and abused by someone other than an initial owner.

According to an embodiment, the abnormal situation may correspond to a case in which authentication authority granted to an owner of the wireless communication terminals 300-1 to 300-3 in an initial authentication process has expired, or the wireless communication terminals 300-1 to 300-3 are out of the scope of the granted authentication authority.

According to an embodiment, the abnormal situation may be determined based on at least one of location data and sensing data (e.g., motion sensing data) received from the wireless communication terminals 300-1 to 300-3. For example, when the wireless communication terminals 300-1 to 300-3 are located in an abnormal place (or outside the authentication authority) or when abnormal movement (e.g., staying in one place for a long time and there is no movement or abnormally rapid movement occurs) of the wireless communication terminals 300-1 to 300-3 is detected, it may be determined as an abnormal situation.

According to an embodiment, the abnormal situation may be divided into various types such as non-wearing, damage, loss, or theft of the wireless communication terminals 300-1 to 300-3.

According to an embodiment, the abnormal situation may be determined based on at least one of image data collected by an image collecting device (e.g., 210-1) and sound data collected by an sound collecting device (e.g., 220-1).

The abnormal situation determined by the abnormal situation determiner 232 may be transmitted to the setting controller 236, and the setting controller 236 may control setting of a wireless communication terminal (e.g., 300-1) in which an abnormal situation occurs according to whether an abnormal situation occurs.

According to an embodiment, according to the type of abnormal situation transmitted from the abnormal situation determiner 232, the setting controller 236 may control setting of a wireless communication terminal (e.g., 300-1) in which the abnormal situation has occurred differently.

The settable area determiner 234 may determine a location of a wireless communication terminal (e.g., 300-1 to 300-3) requiring control of the setting and determine whether the location of the wireless communication terminal (e.g., 300-1 to 300-3) requiring control of the setting is located in a settable area.

Referring to FIGS. 2 and 3 together, the first communicable area RG1 of the first gateway 200-1 and the second communicable area RG2 of the second gateway 200-2 are shown together.

When the first gateway 200-1 controls the setting of the second wireless communication terminal 300-2, normal setting control may be possible only when the second wireless communication terminal 300-2 is located within the range of the communicable area RG1 of the first gateway 200-1 for a certain period of time. However, the location of the second wireless communication terminal 300-2 is continuously changed, and in a situation where setting control is in progress, the second wireless communication terminal 300-2 may deviate from the first communicable area RG1 of the first gateway 200-1. Accordingly, in consideration of the normal walking speed of a person and the time required for controlling setting of a wireless communication terminal (e.g., 300-2), even if the wireless communication terminal (e.g., 300-2) moves after the setting control is started, an area in which the wireless communication terminal (e.g., 300-2) does not deviate from a communicable area (e.g., RG1) until the setting control is completed may be set as a settable area (e.g., RG1-S).

The settable area (e.g., RG1-S) may be set to be less than the communicable area (e.g., RG1).

Similarly, a communicable area (e.g., RG2-S) may be set for the second communicable area RG2 of the second gateway 200-2.

The settable area determiner 234 may check a location of the wireless communication terminal (e.g., 300-2) requiring setting control, and determine whether the location of the wireless communication terminal (e.g., 300-2) requiring setting control is located in the settable area (e.g., RG1-S). The settable area determiner 234 may transmit a result of the determination to the setting controller 236, and the setting controller 236 may start setting control when the wireless communication terminal (e.g., 300-2) is located within the settable area (e.g., RG1-S).

Referring to FIG. 4 together, when the wireless communication terminal (e.g., 300-2) is within the communicable area (e.g., RG1) of the gateway (e.g., 200-1), but is outside the settable area (e.g., RG1-S), the gateway (e.g., 200-1) may transmit data (e.g., control target information (signal transmission level, signal transmission period, target sensor, etc.), or set control value, etc.) necessary for controlling setting of the wireless communication terminal (e.g., 300-2) to an adjacent gateway (e.g., 200-2) based on a movement pattern of the corresponding wireless communication terminal (e.g., 300-2). In this case, based on the movement pattern of the wireless communication terminal (e.g., 300-2), the gateway (e.g., 200-1) may select the adjacent gateway (e.g., 200-2) that is expected to fall within the range of the settable area (e.g., RG2-S) according to the movement pattern from among a plurality of adjacent gateways and may transmit data necessary for setting control to the selected adjacent gateway (e.g., 200-2).

Returning to FIG. 2, the setting controller 236 may control setting of the wireless communication terminal (e.g., 300-1 to 300-3) based on identification information of the first gateway 200-1, identification information of the wireless communication terminal (e.g., 300-1 to 300-3), and sensing data related to the wireless communication terminal (e.g., 300-1 to 300-3).

According to an embodiment, the setting controller 236 may control a signal transmission level or a signal transmission period of a transmitter included in the wireless communication terminal (e.g., 300-1 to 300-3).

According to an embodiment, the setting controller 236 may control power setting of at least one sensor included in the wireless communication terminal (e.g., 300-1 to 300-3).

According to an embodiment, identification information of the gateway (e.g., 200-1) may include information about an area in which the gateway (e.g., 200-1) is installed. For example, the information about the area in which the gateway (e.g., 200-1) is installed may be classified according to the security level of the area. In this case, the identification information of the gateway (e.g., 200-1) may be directly stored in the memory 220 or may be received by requesting the server 100.

According to an embodiment, the setting controller 236 may set the signal transmission period of the transmitter included in the wireless communication terminal (e.g., 300-1 to 300-3) to be relatively short as the security level of the area in which the gateway (e.g., 200-1) is installed is relatively high.

According to an embodiment, the setting controller 236 may set the signal transmission level of the transmitter included in the wireless communication terminal (e.g., 300-1 to 300-3) to be relatively low as the security level of the area in which the gateway (e.g., 200-1) is installed is relatively high.

According to an embodiment, the setting controller 236 may determine a management level of an owner of the wireless communication terminal (e.g., 300-1 to 300-3) based on the identification information of the wireless communication terminal (e.g., 300-1 to 300-3), and may control the setting of the wireless communication terminal (e.g., 300-1 to 300-3) according to the determined management level. In this case, the management level of the owner of the wireless communication terminal (e.g., 300-1 to 300-3) may be directly stored in the memory 220 or may be received by requesting the server 100.

According to an embodiment, the management level of the owner of the wireless communication terminal (e.g., 300-1 to 300-3) may be the severity of the patient in the hospital facility, or the risk of the prisoner in the correctional facility.

According to an embodiment, the setting controller 236 may set the signal transmission period of the transmitter included in the wireless communication terminal (e.g., 300-1 to 300-3) to be relatively short as the management level of the owner of the wireless communication terminal (e.g., 300-1 to 300-3) is relatively high.

According to an embodiment, the setting controller 236 may set the signal transmission level of the transmitter included in the wireless communication terminal (e.g., 300-1 to 300-3) to be relatively low as the management level of the owner of the wireless communication terminal (e.g., 300-1 to 300-3) is relatively high.

According to an embodiment, the setting controller 236 may control the setting of the wireless communication terminal (e.g., 300-1 to 300-3) according to the abnormal situation determined by the abnormal situation determiner 232. When an abnormal situation occurs, the setting controller 236 may set the signal transmission period of the transmitter included in the wireless communication terminal (e.g., 300-1 to 300-3) to be relatively short, or set the signal transmission level of the transmitter included in the wireless communication terminal (e.g., 300-1 to 300-3) to be relatively low.

According to an embodiment, the setting controller 236 may control the setting of the wireless communication terminal (e.g., 300-1 to 300-3) differently according to the type of abnormal situation determined by the abnormal situation determiner 232. According to the severity of each type of abnormal situation that has occurred, as the severity is relatively high, the setting controller 236 may set the signal transmission period of the transmitter included in the wireless communication terminal (e.g., 300-1 to 300-3) to be relatively short, or set the signal transmission level of the transmitter included in the wireless communication terminal (e.g., 300-1 to 300-3) to be relatively low.

According to an embodiment, the setting controller 236 may control power setting of a sensor of the wireless communication terminal (e.g., 300-1 to 300-3) according to the type of abnormal situation determined by the abnormal situation determiner 232. For example, in the case of an abnormal situation in which additional authentication using the wireless communication terminal (e.g., 300-1 to 300-3) is obstructed due to a problem such as a lack of battery in the wireless communication terminal (e.g., 300-1 to 300-3), the setting controller 236 may control the setting so that the power of some sensors in the corresponding wireless communication terminal is turned off.

Figure 5:
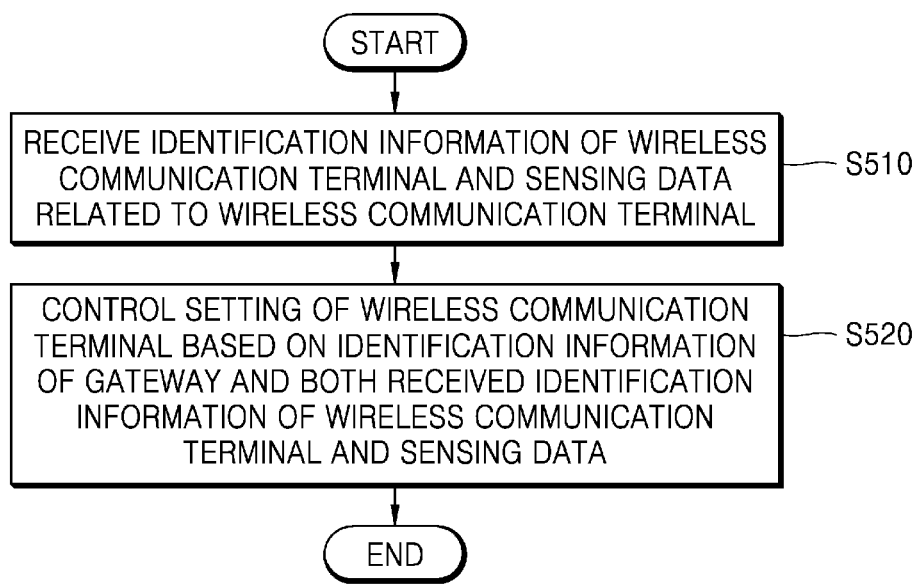
FIG. 5 is a flowchart of a method of operating a gateway according to an embodiment.

FIG. 5 is a flowchart of a method of operating a gateway according to an embodiment.

Referring to FIGS. 1 to 5, in operation S 510, the method of operating a gateway according to an embodiment may receive identification information of the wireless communication terminal (e.g., 300-1 to 300-3) and sensing data related to the wireless communication terminal (e.g., 300-1 to 300-3).

The sensing data related to the wireless communication terminal (e.g., 300-1 to 300-3) may be collected from sensors included in each of the wireless communication terminals 300-1, 300-2, and 300-3, or may be collected from an external device (e.g., the image collecting devices 210-1 and 210-2, and the sound collecting devices 220-1 and 220-2) communicatively connected to a gateway (e.g., 200-1 or 200-2).

According to an embodiment, the sensing data may be location data of each of the wireless communication terminals 300-1, 300-2, and 300-3, motion sensing data, or sensing data regarding whether a user wears the wireless communication terminal.

In operation S520, the method of operating the gateway according to an embodiment may control the setting of the wireless communication terminals 300-1, 300-2, and 300-3 based on the identification information and sensing data of the wireless communication terminals 300-1, 300-2, and 300-3 received in operation S410, and the identification information of the gateway (e.g., 200-1 or 200-2) that received the identification information and sensing data of the wireless communication terminals 300-1, 300-2, and 300-3 received in operation S410.

According to an embodiment, the setting of the wireless communication terminals 300-1, 300-2, and 300-3 controlled by the gateway (e.g., 200-1 or 200-2) may be the signal transmission level of the transmitter included in the wireless communication terminals 300-1, 300-2, and 300-3, the signal transmission period of the transmitter, or the power setting of the sensor.

The method of operating a gateway according to an embodiment may be implemented as a program including program code for performing operations S510 and S520 and stored in a medium, and a processor may be combined with the medium to execute the program.

Methods and apparatuses according to an embodiment may optimize a wireless communication terminal to a control situation by controlling setting of the wireless communication terminal possessed by a user based on identification information of the wireless communication terminal, sensing data related to the wireless communication terminal, and identification information of a gateway.

In addition, method and apparatuses according to an embodiment may reduce the load on a server by directly determining a situation at a gateway end and controlling setting of a wireless communication terminal possessed by a user according to the determined situation.

While the present disclosure has been particularly shown and described with reference to embodiments thereof, it will be understood that various changes in form and details may be made therein without departing from the scope of the following claims.

What is claimed is:

1. A method of operating a gateway performing communication between a server and a wireless communication terminal, the method comprising:
   receiving, by the gateway, identification information of the wireless communication terminal and sensing data related to the wireless communication terminal; and
   controlling, by the gateway, setting of the wireless communication terminal based on identification information of the gateway and both the received identification information of the wireless communication terminal and the sensing data,
   wherein the identification information of the gateway comprises information about an area in which the gateway is installed, wherein the controlling setting of the wireless communication terminal comprises:

checking, by the gateway, a location of the wireless communication terminal requiring setting control, and starting setting control when the location of the wireless communication terminal is located within a settable area, wherein the settable area is set to be less than a communicable area of the gateway, and wherein the method further comprises transmitting, by the gateway, data for controlling setting of the wireless communication terminal to an adjacent gateway based on a movement pattern of the wireless communication terminal when the location of the wireless communication terminal is within the communicable area of the gateway but is outside the settable area.

2. The method of claim 1, wherein the sensing data is sensing data directly collected by the wireless communication terminal or sensing data collected from an external device communicatively connected to the gateway.

3. The method of claim 1, wherein the controlling of setting of the wireless communication terminal comprises:

controlling a signal transmission level or a signal transmission period of a transmitter included in the wireless communication terminal.

4. The method of claim 1, wherein the controlling of setting of the wireless communication terminal comprises:

controlling power setting of at least one sensor included in the wireless communication terminal.

5. The method of claim 1, wherein the information about an area in which the gateway is installed is classified according to a security level of the area in which the gateway is installed.

6. The method of claim 5, wherein the controlling of setting of the wireless communication terminal comprises:

setting a signal transmission period of a transmitter to be relatively short as the security level of the area in which the gateway is installed is relatively high.

7. The method of claim 5, wherein the controlling of setting of the wireless communication terminal comprises:

setting a signal transmission level of a transmitter included in the wireless communication terminal to be relatively low as the security level of the area in which the gateway is installed is relatively high.

8. The method of claim 1, wherein the controlling of setting of the wireless communication terminal comprises:

determining, by the gateway, a management level of an owner of the wireless communication terminal based on the identification information of the wireless communication terminal; and controlling, by the gateway, setting of the wireless communication terminal according to the determined management level.

9. The method of claim 8, wherein the management level is severity of a patient in hospital facility or risk of a prisoner in correctional facility.

10. The method of claim 1, wherein the controlling of setting of the wireless communication terminal comprises:

determining, by the gateway, whether an abnormal situation occurs in an owner of the wireless communication terminal based on the sensing data; and controlling, by the gateway, setting of the wireless communication terminal according to the determined occurrence of the abnormal situation.

11. The method of claim 10, wherein the controlling of setting of the wireless communication terminal comprises:

setting, by the gateway, a relatively short signal transmission period of a transmitter included in the wireless communication terminal, or setting a relatively low signal transmission level of the transmitter when the abnormal situation occurs.

12. The method of claim 10, wherein the controlling of setting of the wireless communication terminal comprises:

controlling, by the gateway, different settings of the wireless communication terminal according to a type of the abnormal situation.

13. A gateway performing communication between a server and a wireless communication terminal, the gateway comprising:

a communication interface receiving identification information of the wireless communication terminal and sensing data related to the wireless communication terminal; and a setting controller configured to control setting of the wireless communication terminal based on identification information of the gateway and both the received identification information of the wireless communication terminal and the sensing data, wherein the identification information of the gateway comprises information about an area in which the gateway is installed, wherein the gateway further comprising:

a settable area determiner configured to check a location of the wireless communication terminal requiring setting control, and determine whether the location of the wireless communication terminal requiring setting control is located within a settable area, and transmit a result of the determination to the setting controller, wherein the setting controller starts setting control when the location of the wireless communication terminal is located within the settable area, wherein the settable area is set to be less than a communicable area of the gateway, and wherein the setting controller transmits data for controlling setting of the wireless communication terminal to an adjacent gateway based on a movement pattern of the wireless communication terminal when the location of the wireless communication terminal is within the communicable area of the gateway but is outside the settable area.

* * * * *